United States Patent
Peratello et al.

(10) Patent No.: US 6,638,888 B1
(45) Date of Patent: *Oct. 28, 2003

(54) MESOPOROUS ALUMINA GEL AND PROCESS FOR ITS PREPARATION

(75) Inventors: Stefano Peratello, Nova Milanese (IT); Giuseppe Bellussi, Piacenza (IT); Vicenzo Calemma, San Donato Milanese (IT); Roberto Millini, Riozzo-Cerro al Lambro (IT)

(73) Assignee: Eniricerche S.p.A., San Donato Milanese (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/645,757

(22) Filed: May 14, 1996

(30) Foreign Application Priority Data

Jun. 15, 1995 (IT) .......................................... MI95A1283

(51) Int. Cl.$^7$ .................................................. C01F 7/02
(52) U.S. Cl. ........................ 502/202; 423/628; 502/208; 502/211; 502/248; 502/263
(58) Field of Search ........................ 252/315.7; 502/248, 502/263, 202, 208, 211, 355; 516/112; 423/628, 629

(56) References Cited

U.S. PATENT DOCUMENTS

| | | | |
|---|---|---|---|
| 3,617,488 A | * 11/1971 | Csicsery ...................... 502/66 |
| 3,920,539 A | 11/1975 | Hamner et al. .............. 502/211 |
| 4,172,809 A | * 10/1979 | Triki .......................... 423/628 |
| 4,389,385 A | * 6/1983 | Ramsay ................... 252/315.7 |
| 4,716,140 A | 12/1987 | Kemp ..................... 208/216 R |
| 4,732,886 A | * 3/1988 | Tomino ....................... 502/314 |
| 4,849,378 A | * 7/1989 | Hench ...................... 252/315.7 |
| 4,950,633 A | * 8/1990 | Yamaguchi et al. ........ 502/314 |
| 5,049,536 A | 9/1991 | Bellussi et al. .............. 502/235 |
| 5,342,814 A | 8/1994 | Peratello et al. ............. 502/263 |
| 5,434,118 A | 7/1995 | Carati et al. ................. 502/242 |
| 5,486,613 A | 1/1996 | Broussard et al. ........... 546/181 |
| 5,498,811 A | 3/1996 | Perego et al. ................ 585/324 |
| 5,602,292 A | * 2/1997 | Perego et al. ................ 585/750 |
| 5,608,134 A | * 3/1997 | Perego et al. ................ 585/750 |
| 5,622,684 A | * 4/1997 | Pinnavaia et al. ........... 423/704 |

FOREIGN PATENT DOCUMENTS

| | | |
|---|---|---|
| EP | 0 659 478 | 6/1995 |
| GB | 2 116 868 | 10/1983 |

* cited by examiner

Primary Examiner—Stuart L. Hendrickson
(74) Attorney, Agent, or Firm—Oblon, Spivak, McClelland, Maier & Neustadt, P.C.

(57) ABSTRACT

The present invention relates to a mesoporous gel comprising an alumina matrix in which one or more oxides selected from silica, boron oxide, phosphorus oxide, oxides of metals of groups VIII and VIB, may be uniformly dispersed. The present invention also relates to a process for the preparation of this gel and its uses as carrier, as catalyst for acid-catalyzed reactions and as hydrotreating catalyst.

28 Claims, 10 Drawing Sheets

MESOPOROUS ALUMINA GEL AND PROCESS FOR ITS PREPARATION

Figure 1:
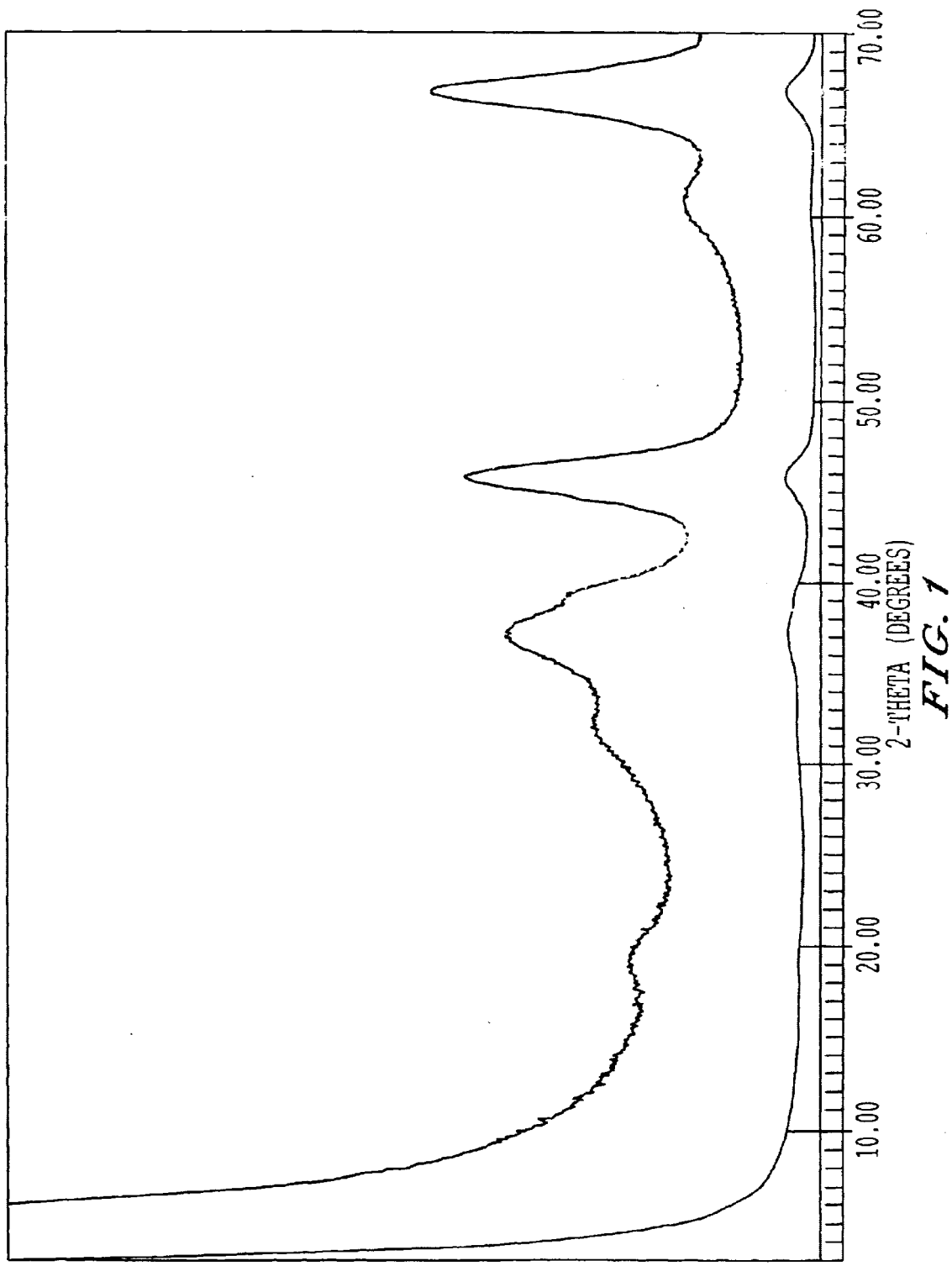

The present invention relates to a mesoporous gel comprising an alumina matrix in which one or more oxides selected from silica, boron oxide, phosphorus oxide, oxides of metals from groups VIII and VIB, may be uniformly dispersed. The present invention also relates to a process for the preparation of this gel and its uses as carrier, as catalyst for acid-catalyzed reactions and as hydrotreating catalyst.

The possibility of synthesizing an amorphous alumino-silicate with a high silica content (molar ratio $SiO_2/Al_2O_3=$ 70–100) and with a high surface area, characterized by a limited distribution of mesoporosity (with pore dimensions within the range of 37 Å and 150 Å), is known in literature (M. R. Manton and J. C. Davidtz, Journal of Catalysis (1979), Vol. 60, pages 156–166). These materials have not however found practical applications. More recently, European patent 463.673 and U.S. Pat. Nos. 4.992.608 and 5.049.536 describe the possibility of obtaining amorphous alumino-silicates with a high silica content ($SiO_2/Al_2O_3=$ 30–500) with a rather limited distribution of the pore dimensions (average diameter about 10 Å or less, basic absence of pores with a diameter of more than 30 Å) and excellent catalytic properties in acid-catalyzed reactions.

Even more recently, Italian patent application MI 93 A 002696 describes amorphous alumino-silicates with a high silica content characterized by a dimensionally very limited distribution of the micro-mesoporosity, obtained by a process in which the gelification is carried out at the boiling point (or a little higher) of the alcohols produced by the hydrolysis of the reagents, without eliminating the alcohols themselves from the reagent mixture.

Patent application WO 91/11390 discloses the possibility of obtaining a new group of mesoporous alumino-silicates with a high silica content, called M41S, having an average pore diameter of between 20 Å and 100 Å and regularly organized in the material according to a hexagonal (MCM-41) or cubic (MCM-48) structure.

The product obtained is characterized by an X-ray diffraction spectrum from powders (XRD) leading to a hexagonal structure with a bidimensional order or to a structure with cubic symmetry. Analyses carried out via high resolution transmission electron microscopy (HREM) show, in the case of mesoporous silico-aluminates with a hexagonal symmetry (called MCM-41), the presence of monodimensional mesoporosity regularly organized according to a honeycomb hexagonal structure.

In Italian patent application Mi 94 A 01399 it has been found that it is possible to produce micro-mesoporous metal-silicates, with a ratio $SiO_2/Al_2O_3$ of more than 20, characterized by a narrow distribution of the pore dimensions and with a partial order of these. In fact, whereas the alumino-silicates obtained with the process described in the above Italian patent application Mi 93A002696 are completely amorphous, these new materials called ERS-8, are characterized by an X-ray diffraction spectrum (XRD) from powders which has a diffuse reflection at low angles, indicating a short-range order of the mesoporous structure. The existence of a short-range structural order allows this group of materials to be identified as intermediates among analogous orderly materials (M41S) and completely disorderly materials (amorphous alumino-silicates).

The necessity of having materials with a high surface area, a high pore volume with controlled dimensions is not however only limited to silicas.

At present for example there is a particular interest in hydrotreating catalysts which mostly consist of metals belonging to groups VIB and VIII, supported on alumina (A. B. Stiles, "Catalysts manufacture, laboratory and commercial preparation", Dekker, N.Y., 1983; B. Delmon, "Studies in surface science and catalysis", vol. 53, 1989, page 1–40). For these hydrotreating catalysts of heavy charges it now seems evident, on the basis of information obtained in this field, that the following characteristics are desirable:

a limited microporous fraction (d<20 Å) to minimize shape-selectivity phenomena;

a pore distribution not centered in the macroporous region (d<500 Å), as the consequent low surface area would be incompatible with a good dispersion of the active phase.

At present these catalysts are prepared for impregnating the carrier with the above metals, in excess or deficiency of the solvent. Gamma-alumina, characterized by a surface area of 200–250 $m^2/g$ and an enlarged distribution of the pore diameter centered on 100 Å, is the most widely-used carrier at the moment. Its surface area is further reduced by occlusion during the impregnation processes.

The Applicant has now surprisingly found a new group of materials which have improved characteristics compared to the catalysts of the prior art. These materials are mesoporous gels which comprise an alumina matrix in which one or more oxides selected from silica, boron oxide, phosphorus oxide, oxides of metals of groups VIII and VIB, may be uniformly dispersed, characterized by a controlled distribution of the porosity, a high surface area and a high dispersion of the above oxides, when present.

These materials, depending on their chemical composition, can be well used in various applications. For example, they can be used as mesoporous carriers with a controlled porosity for catalysts, as catalysts for acid-catalyzed reactions and as hydrotreating catalysts. In particular for example gels consisting of alumina alone or gels comprising alumina and one or more oxides selected from silica, boron oxide and phosphorus oxide, preferably silica, can be very suitably used as a carrier for catalysts. In the latter case the presence of these oxides makes the materials with this composition also appropriate as catalysts for acid-catalyzed reactions.

The gels of the present invention which comprise alumina, metal oxides of group VIB and/or VIII, and possibly one or more oxides selected from silica, boron oxide and phosphorus oxide, preferably silica, have a high stability as hydrotreating catalyst.

A first object of the present invention therefore relates to a mesoporous gel comprising an alumina matrix in which one or more oxides selected from silica, boron oxide, phosphorus oxide, the oxide of a metal of group VIII and/or VIB having general formula $MO_x$, may be uniformly dispersed, with the following molar ratios between said oxides and the alumina:

$SiO_2/Al_2O_3=0–3.0$ $B_2O_3/Al_2O_3=0–4.0$ $P_2O_5/Al_2O_3=0–0.2$ $MO_x/Al_2O_3=0–0.2$ with a surface area of between 260 and 700 $m^2/g$, with a pore volume of between 0.2 and 1.0 $cm^3/g$ and with an average pore diameter of between 20 and 70 Å.

The surface area is preferably between 400 and 700 $m^2/g$ and the pore diameter between 20 and 60 Å. According to a preferred aspect of the present invention, the gel consists of alumina alone or comprises alumina and one or more oxides selected from silica, boron oxide and/or phosphorus oxide, preferably silica. According to another preferred aspect of the present invention, the gel comprises alumina, oxides of metals of group VIB and/or VIII, and possibly one or more oxides selected from silica, boron oxide and/or phosphorus oxide, preferably silica. The metal of group VIB is preferably Mo, that of group VIII is preferably Ni.

The X-ray diffraction spectrum from powders (XRD) of these mesoporous gels (called TEG), recorded by means of a Philips vertical diffractometer, equipped with a proportional pulse counter, divergent and receiving sleds of 1/6° and with CuKα radiation ($\lambda$=1.54178 Å), may have an enlarged diffraction line, or however a diffuse scattering, at angular values of not more than 2θ=5°, which can be interpreted with the presence of a short-range order of the mesoporous structure, with a limited structural correlation basically only at the first neighbours, whereas weak and enlarged reflections can always be observed in the high angular region, indicating the incipient formation of a crystalline phase of the y-alumina type.

This mesoporous gel is characterized by a surface area of between 260 m$^2$/g and 700 m$^2$/g, determined with the B.E.T. method by adsorption-desorption cycles of $N_2$ at the temperature of liquid nitrogen (77 K) using a Carlo Erba Sorptomatic 1900 instrument, and by a pore volume of between 0.2 cm$^3$/g and 1.0 cm$^3$/g. The pore diameter is between 70 and 20 Å, and using the terminology suggested by IUPAC "Manual of Symbols and Terminology" (1972), Appendix 2, Part I Coll.Surface Chem. Pure Appl. Chem., Vol. 31, page 578, in which micropores are defined as pores with a diameter of less than 20 Å and mesopores as those with a diameter of between 20 Å and 500 Å, this gel has been classified as a mesoporous solid.

The gels of the present invention can be obtained by a process which comprises:

(a) preparing a solution, in an alcohol having the formula R"OH, wherein R" is a linear or branched $C_1$-$C_5$ group of an aluminium alkoxide having the formula Al (OR)$_3$, wherein R is a linear or branched $C_1$-$C_5$ alkyl group, and possibly of a source of one or more elements selected from silicon, boron, phosphorus, and/or a compound soluble in an alcohol environment of a metal of group VIII;

(b) subjecting the alcohol solution prepared in step (a) to hydrolysis and gelification, at a temperature of between 20 and 80° C., with a water solution containing a hydroxide of tetralkylammonium having the formula R'$_4$N—OH, wherein R' is a linear or branched $C_2$-$C_7$ alkyl group, and possibly a compound of a metal of group VIB soluble in a basic environment, the quantity of the constituents of the mixture thus obtained being such as to respect the following molar ratios:

$H_2O/Al_2O_3$ = 15–100
R"—OH/$AL_2O_3$ = 5–50
R'$_4$N—OH/$Al_2O_3$ = 0.3–5
$SiO_2/Al_2O_3$ = 0–3.0
$B_2O_3/Al_2O_3$ = 0–4.0
$P_2O_5/Al_2O_3$ = 0–0.2
$MO_x/Al_2O_3$ = 0–0.2

(c) subjecting the gel obtained in step (b) to drying and calcination.

The silica source can be selected from tetraalkylorthosilicates having the formula Si(OR''')$_4$, wherein R''' is a $C_1$-$C_3$ alkyl group, the boron source can be selected from boric acid and trialkylborates having the formula B(OR$^{iv}$)$_3$ wherein R$^{iv}$ can be for example ethyl or propyl, the phosphorus source can be selected from phosphoric acid and soluble phosphorus salts.

The compounds soluble in an alcohol environment of metals of group VIII can be for example acetylacetonates.

The compounds soluble in a basic environment of metals of group VIB can be selected from all those which are soluble in a water environment, for example (NH$_4$)$_6$Mo$_7$O$_{24}$.4H$_2$O.

In the embodiment of step (b) of the above process the order of addition of the two solutions is practically indifferent. After this addition, there is an increase in the viscosity of the reagent mixture, at a rate depending directly on the temperature and composition of the mixture itself, until the formation of a gel. The gelification process is completed in a time of between 1 minute and 3 hours. The gel can be subsequently subjected to aging for a time of between 1 and 72 hours, at a temperature of between 20° C. and 80° C.

In step (c) of the above process, the gel obtained in step (b) is dried at a temperature of between 50 and 60° C. under vacuum and finally calcined in air at a temperature of between 450° C. and 550° C. for 6–8 hours.

As already mentioned, the gels of the present invention can be suitably used, depending on their chemical composition, as carriers for catalysts, as acid catalysts, when they contain one or more oxides selected from silica, boron oxide and phosphorus oxide, as hydrotreating catalysts, when they contain metals of groups VIB and VIII. In the latter case, they can also, for example, be subjected to impregnation with water solutions of compounds of metals of groups VIII and VIB.

Some illustrative examples are given to provide a better understanding of the present invention and for its embodiment but do not limit the scope of the invention in any way.

EXAMPLE 1

50 g of aluminium sec-butylate are dissolved in 100 g of n-butanol under heat. The solution obtained is added rapidly and under vigorous stirring to 100 g of a water solution of tetrapropylammonium hydroxide (TPA-H) at 12.8% by weight.

The composition of the mixture, expressed as molar ratios, is the following:

TPA-OH/$Al_2O_3$=0.63
n-$C_4H_9$OH/$Al_2O_3$=13.5
$H_2O/Al_2O_3$=48.4

After about 30 minutes the solution, which in the meantime has become more viscous, begins to become turbid until it becomes completely white. The gel obtained is then dried in a rotavapor at 60° C. under vacuum and the residual solid is calcined for 8 hours at 550° C.

Figure 2:
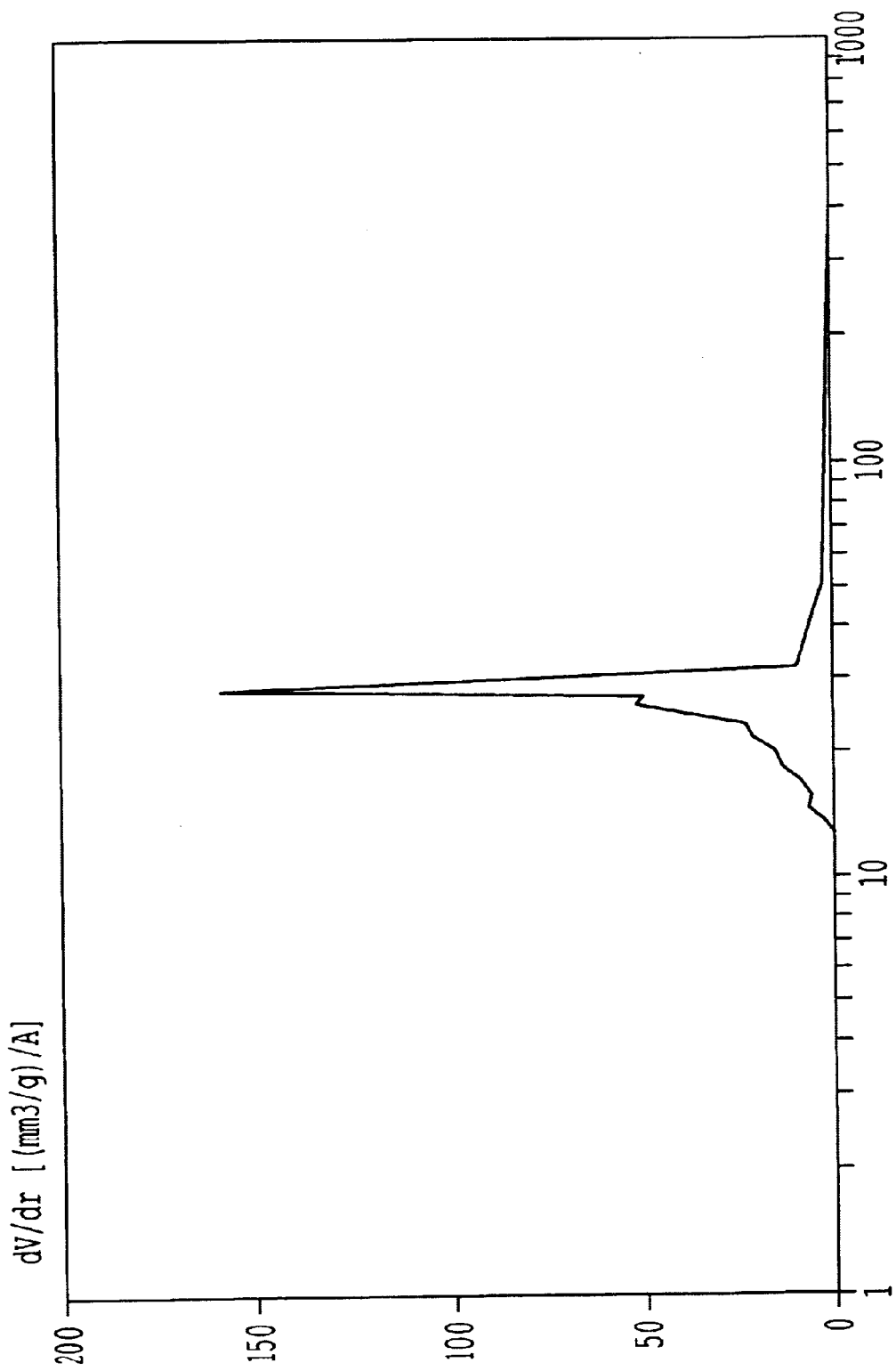

The material thus obtained has a surface area of 267, m$^2$/g, the specific pore volume is 0.438 cm$^3$/g and the dimensional distribution of the pores is centered at about 55 Å in diameter FIG. 2). The XRD spectrum has in the high angular region a pattern typical of γ alumimina FIG. 1) whereas in the low angular region there are no particular coherent scattering phenomena FIG. 3, curve B).

EXAMPLE 2

26 g of aluminium sec-butylate are dissolved in 100 g of n-butanol under heat. 2.1 g of tetraethylor-thosilicate are then added. The solution obtained is added rapidly and under vigorous stirring to 50 g of a water solution of tetrapropylammonium hydroxide (TPA-OH) at 12.8% by weight.

The composition of the mixture, expressed as molar ratios, is the following:

$SiO_2/Al_2O_3=0.191$ $TPA-OH/Al_2O_3=0.6$ $n-C_4H_9OH/Al_2O_3=12.8$ $H_2O/Al_2O_3\ 45.8$

The mixture becomes viscous, but remains limpid and homogeneous. The solution is evaporated in a rotavapor at 60° C. under vacuum and the residual gel is calcined for 8 hours at 550° C.

Figure 5:
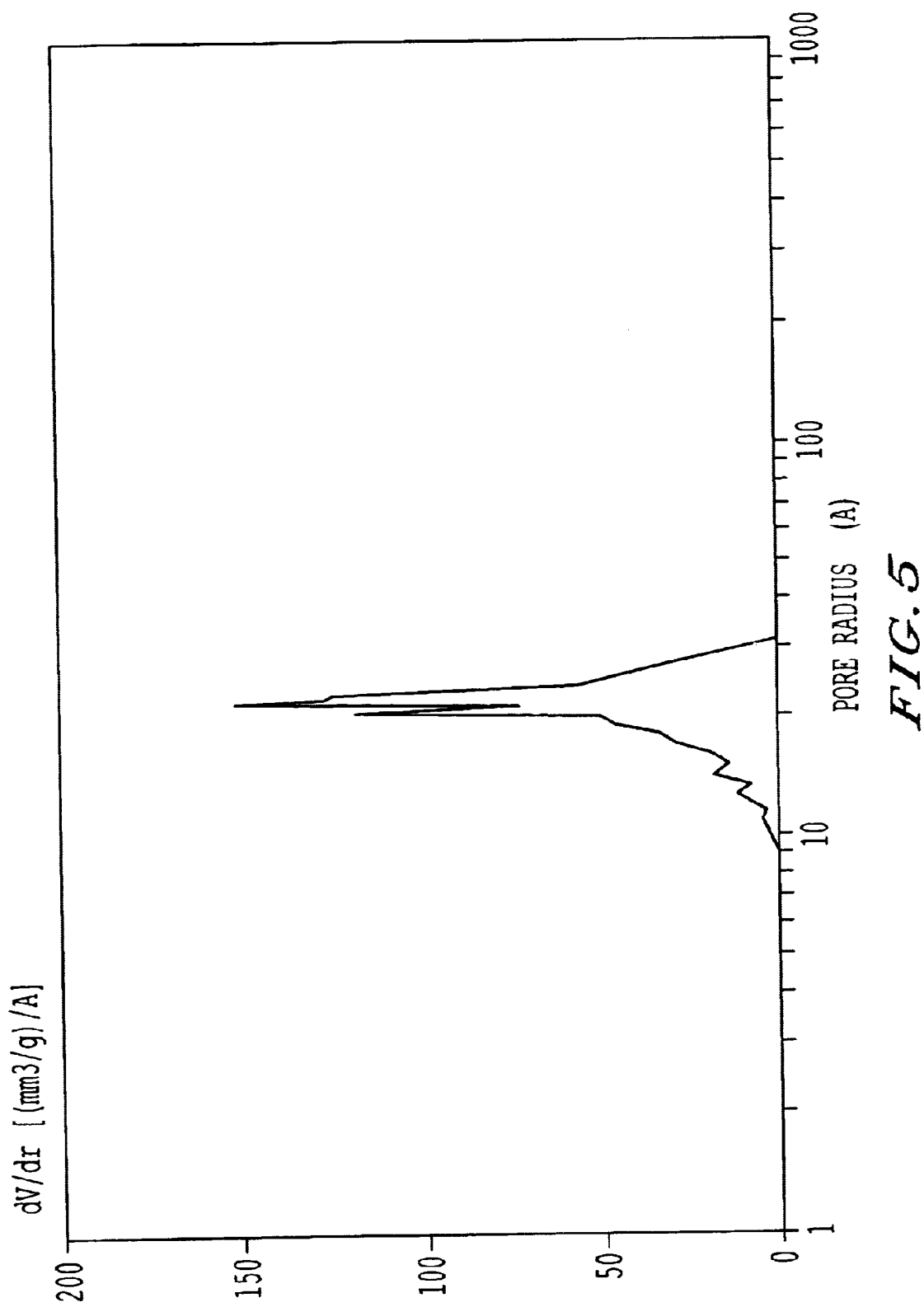

The material thus obtained has a surface area of 428 m²/g, the specific pore volume is 0.522 cm³/g and the dimensional distribution of the pores is centered at about 45 Å in diameter FIG. 5).

Figure 3:
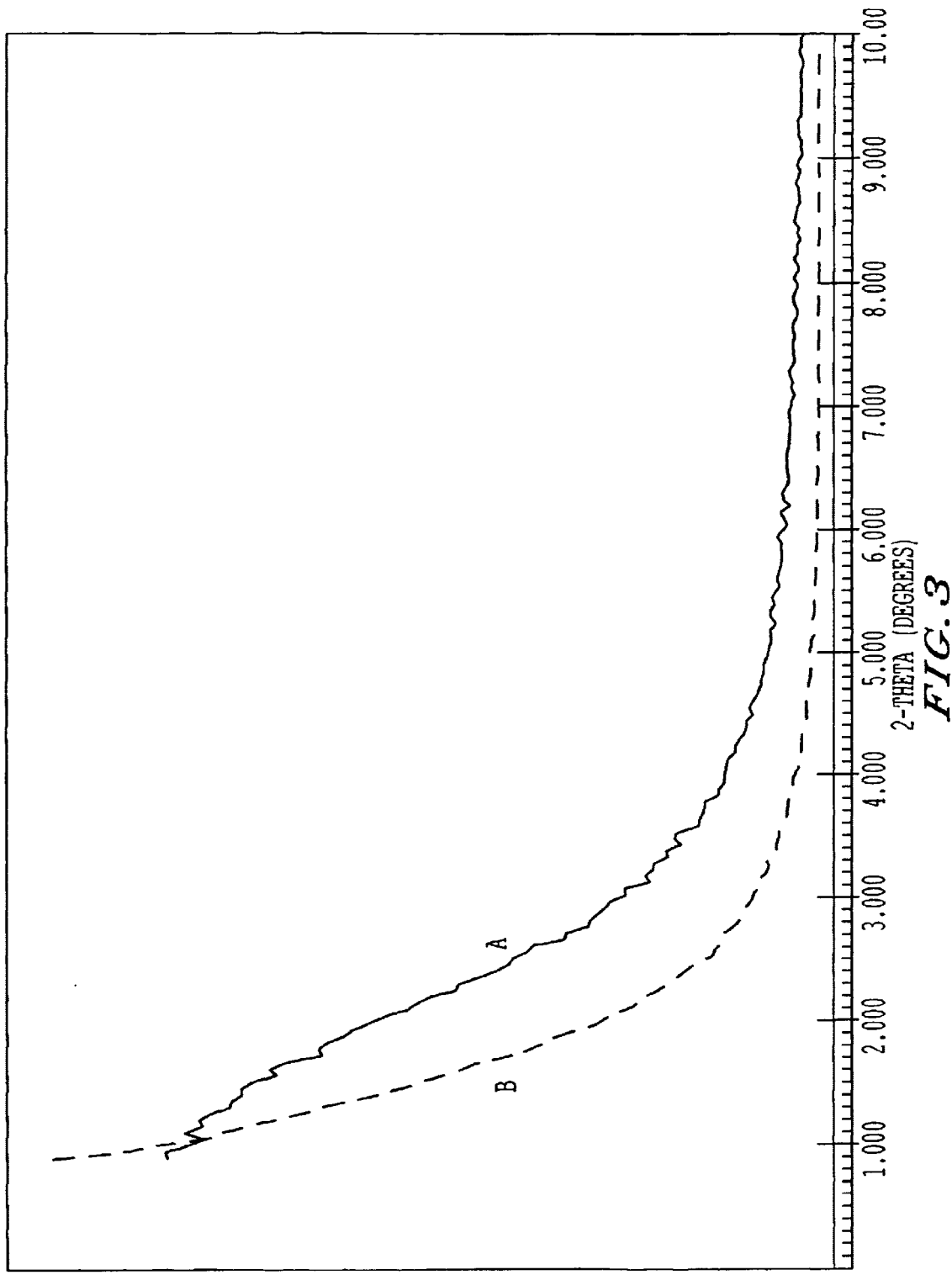

The XRD spectrum shows the presence of a weak scattering phenomenum between 1 and 4° 2θ FIG. 3, curve Å). Weak and diffuse scattering can also be observed around 45 and 66 ° 2θ, owing to the incipient formation of a γ-alumina type phase.

EXAMPLE 3

26 g of aluminium sec-butylate are dissolved in 50 g of n-butanol under heat. 4.8 g of tetraethylorthosilicate are then added. The solution obtained is added rapidly and under vigorous stirring to 50 g of a water solution of tetrapropylammonium hydroxide (TPA-OH) at 12.8% by weight.

The composition of the mixture, expressed as molar ratios, is the following:

$SiO_2/Al_2O_3=0.436$ $TPA-OH/Al_2O_3=0.6$ $n-C_4H_9OH/Al_2O_3=12.8$ $H_2O/Al_2O_3=45.8$

At the end the solvent is evaporated in a rotava por at 60° C. under vacuum and the residual gel is calcined for 8 hours at 550° C.

The material thus obtained has a surface area of 534 m²/g, the specific pore volume is 0.332 cm³/g and the dimensional distribution of the pores is centered at about 40 Å in diameter.

The XRD spectrum shows the presence of a weak scattering phenomenum between 1 and 4° 2θ. Weak and diffuse scattering can be observed around 45 and 66° 2θ, owing to the incipient formation of a γ-alumina type phase.

EXAMPLE 4

A first solution is prepared by dissolving under heat 24.6 g of aluminium sec-butylate in 47.9 g of n-butanol. 5.2 g of tetraethylorthosilicate and 0.82 g of Ni acetylacetonate are then added. A transparent homogeneous green-coloured solution is obtained. A second solution is prepared by dissolving 1.2 g of ammonium tetrahydrate heptamolibdate in 47.6 g of a water solution of TPA-OH at 12.8% by weight. The first solution is added rapidly and under vigorous stirring, to the second solution.

The composition of the mixture, expressed as molar ratios, is the following:

$SiO_2/Al_2O_3=0.5$ $TPA-OH/Al_{23}=0.6$ $n-C_4H_9OH/Al_2O_3=12.9$ $H_2/Al_2O_3=46.2$ $MoO_3/Al_2O_3=0.13$ $NiO/Al_2O_3=0.06$

At the end of the reaction a homogenous gelatinous and viscous greenish-blue coloured product is obtained which is dried in a rotavapor at 60° C. under vacuum and calcined for 8 hours at 550° C.

Figure 8:
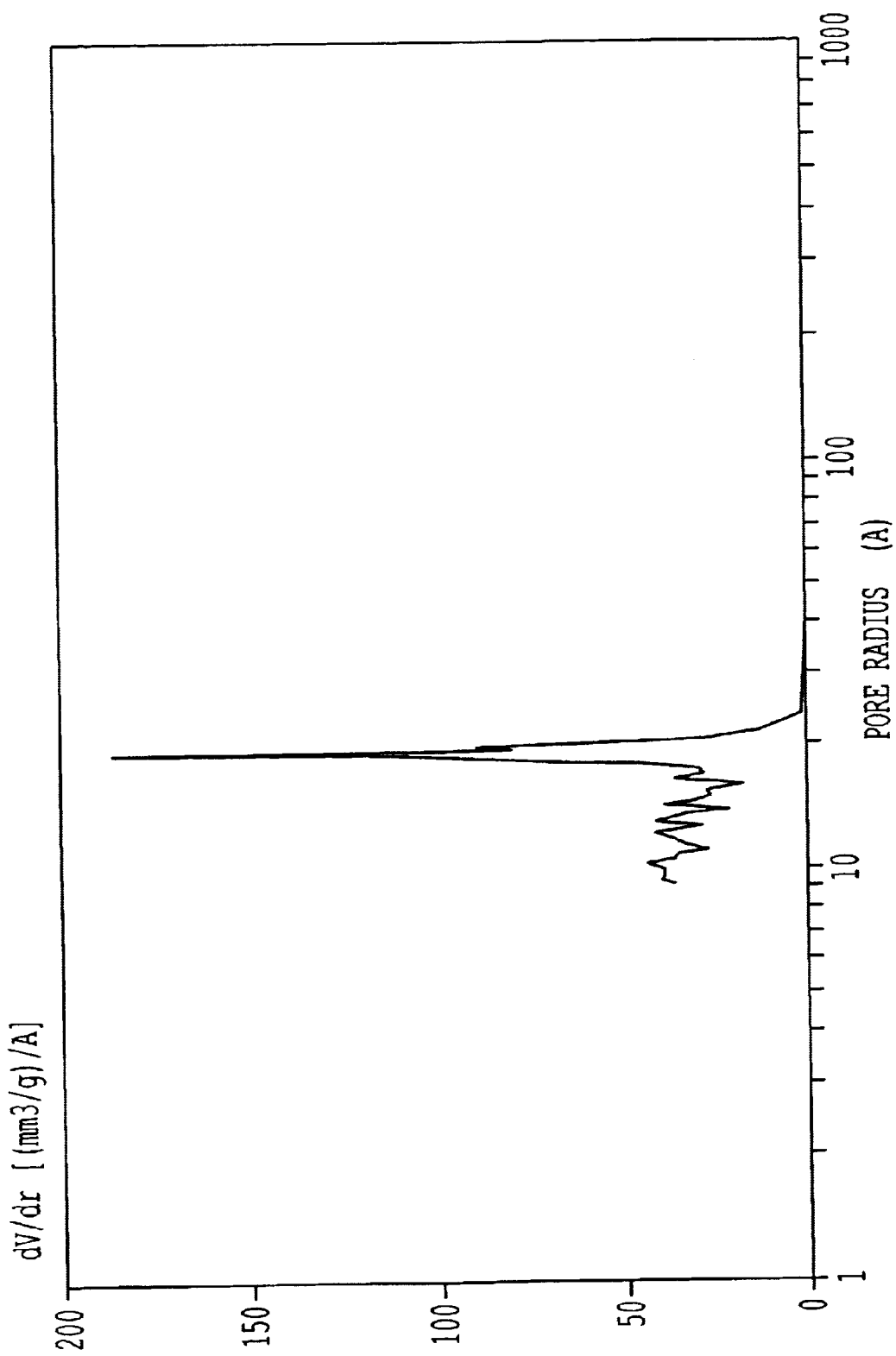

The material thus obtained has a surface area of 610 m²/g, the specific pore volume is 0.97 cm³/g and the dimensional distribution of the pores is centered at about 40 Å in diameter FIG.8).

Figure 6:
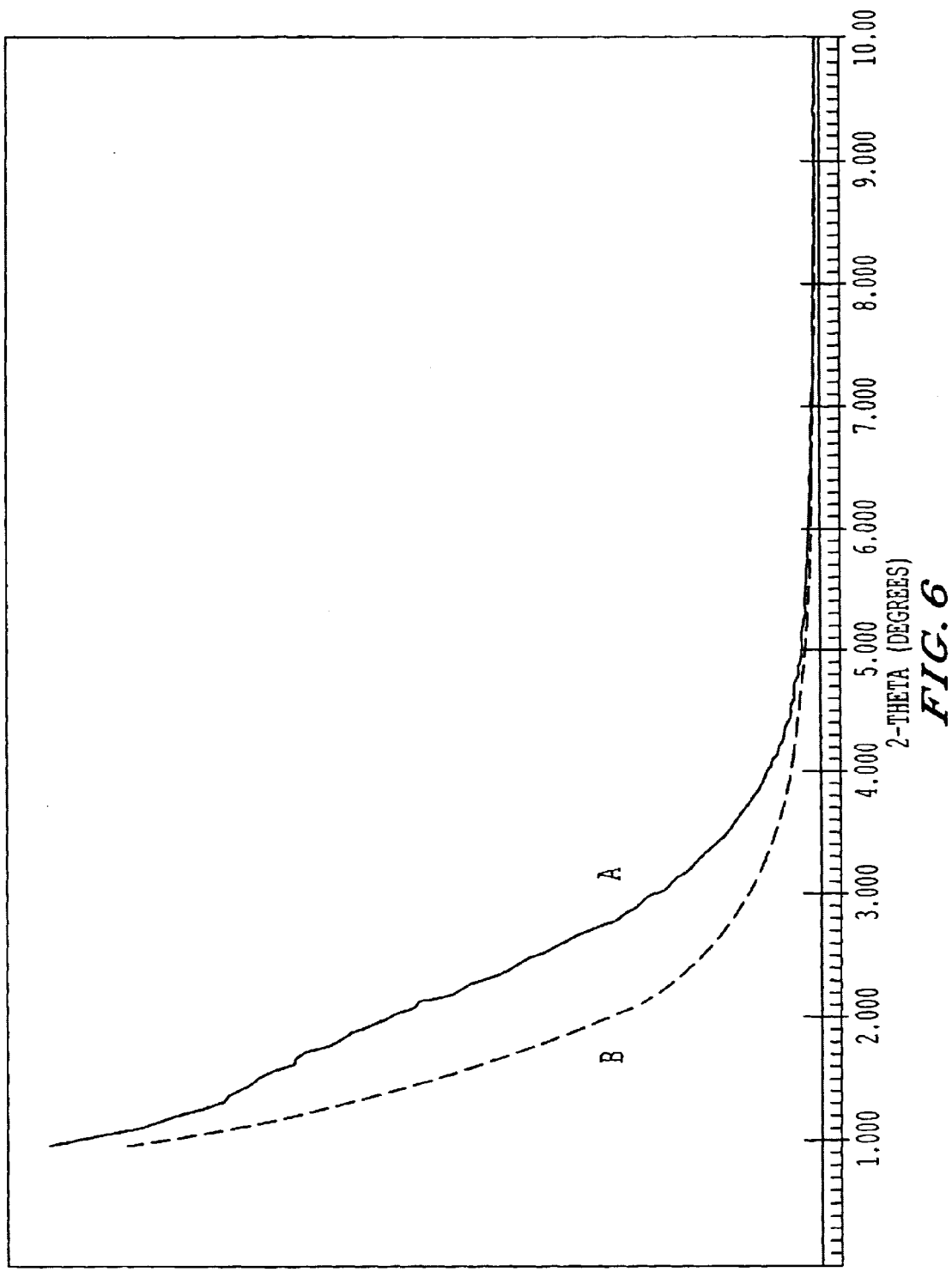

The XRD spectrum shows the presence of a weak scattering phenomenum between 1 and 3° 2θ (FIG. 6, curve A, comparative curve B relates to the sample of example 1). Weak and diffuse scattering can be observed around 45 and 66° 2θ, owing to the incipient formation of a γ-alumina type phase.

There are no scattering phenomena which can be attributed to crystalline phases of the Mo and Ni, indicating a high dispersion of the two metal elements in the alumino-silicatic matrix.

EXAMPLE 5

A first solution is prepared by dissolving under heat 24.6 g of aluminium sec-butylate in 47.9 g of n-butanol. 5.2 g of tetraethylorthosilicate are then added.

A second solution is prepared by dissolving 1.2 g of ammonium tetrahydrate heptamolibdate in 47.6 g of a water solution of TPA-OH at 12.8% by weight. This solution is maintained at 90° C. in a flask equipped with a reflux condenser.

The first solution is added rapidly and under vigorous stirring to the second solution and the resulting mixture is maintained at 90° C. for an hour, still under stirring.

The composition of the mixture, expressed as molar ratios, is the following:

$SiO_2Al_2O_3=0.5$ $TPA-OH/Al_2O_3=0.6$ $n-C_4H9OH/Al_2O_3=12.9$ $H_2O/Al_2O_3=46.5$ $MoO_3/Al_2O_3=0.13$

At the end of the reaction an apparently homogenous gelatinous product is obtained which, once cooled, is dried in a rotavapor at 50–60° C. under vacuum and calcined for 8 hours at 500° C.

The material thus obtained has a surface area of 414 m²/g, the specific pore volume is 0.347 cm³/g and the dimensional distribution of the pores is centered at about 40 Å in diameter.

Figure 7:
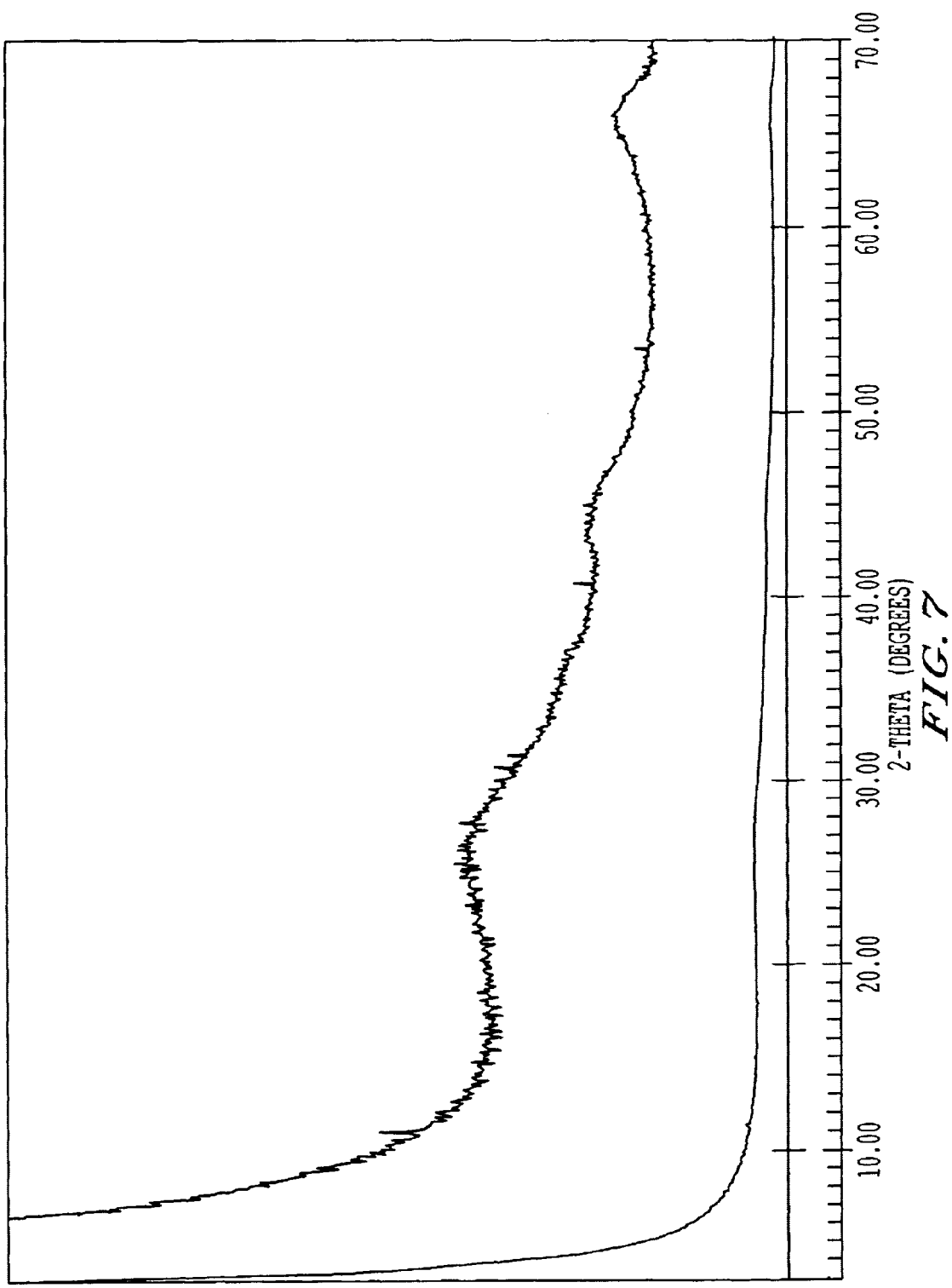

The XRD spectrum shows the presence of a weak scattering phenomenum between 1 and 4° 2θ. Weak and diffuse scatterings similar to those shown in FIG. 7, can be observed around 45 and 66° 2θ, owing to the incipient formation of a γ-alumina type phase.

EXAMPLE 6

Example 5 is repeated with the only modification that the order of mixing the first and second solution is inverted.

The material thus obtained has a surface area of 386 m²/g, the specific pore volume is 0.372 cm³/g and the dimensional distribution of the pores is centered at about 40 Å in diameter.

The XRD spectrum shows the presence of a weak scattering phenomenum between 1 and 4° 2θ. Weak and diffuse scatterings similar to those shown in FIG. 7, can be observed around 45 and 66° 2θ, owing to the incipient formation of a γ-alumina type phase.

EXAMPLE 7

A first solution is prepared by dissolving under heat 24.6 g of aluminium sec-butylate in 47.9 g of n-butanol. 5.2 g of tetraethylorthosilicate are then added.

A second solution is prepared by dissolving 1.2 g of ammonium tetrahydrate heptamolibdate in 23.6 g of a water solution of TPA-OH at 25.9% by weight. This solution is maintained at 90° C. in a flask equipped with a reflux condenser.

The first solution is added rapidly and under vigorous stirring to the second solution and the resulting mixture is maintained at 90° C. for an hour, still under stirring.

The composition of the mixture, expressed as molar ratios, is the following:

$SiO_2/Al_2O_3=0.5$
$TPA-OH/A/Al_2O_3=0.6$
$n-C_4H_9OH/Al_2O_3=12.9$
$H_2O/Al_2O_3=19.4$
$MoO_3/Al_2O_3=0.13$

At the end of the reaction an apparently homogenous gelatinous product is obtained which, once cooled, is dried in a rotavapor at 50-60° C. under vacuum and calcined for 8 hours at 500° C.

The material thus obtained has a surface area of 543 m$^2$/g, the specific pore volume is 0.357 cm$^3$/g and the dimensional distribution of the pores is centered at about 40 Å in diameter.

The XRD spectrum does not show the presence of any significant scattering phenomenum. Weak and diffuse scatterings similar to those shown in FIG. 7, can be observed around 45 and 66° 2θ, owing to the incipient formation of a γ-alumina type phase.

EXAMPLE 8

A first solution is prepared by dissolving under heat 24.6 g of aluminium sec-butylate in 24.0 g of n-butanol. 5.2 g of tetraethylorthosilicate are then added.

A second solution is prepared by dissolving 1.2 g of ammonium tetrahydrate heptamolibdate in 47.6 g of a water solution of TPA-OH at 12.8% by weight. This solution is maintained at 90° C. in a flask equipped with a reflux condenser.

The first solution is added rapidly and under vigorous stirring to the second solution and the resulting mixture is maintained at 90° C. for an hour, still under stirring.

The composition of the mixture, expressed as molar ratios, is the following:

$SiO_2/Al_2O_3=0.5$
$TPA-OH/Al_{23}=0.6$
$n-C_4H_9OH/Al_2O_3=6.5$
$H_2O/Al_2O_3=46.5$
$MoO_3/Al_2O_332\ 0.13$

At the end of the reaction an apparently homogenous gelatinous product is obtained which, once cooled, is dried in a rotavapor at 50–60° C. under vacuum and calcined for 8 hours at 500° C.

The material thus obtained has a surface area of 395 m$^2$/g, the specific pore volume is 0.282 cm$^3$/g and the dimensional distribution of the pores is centered at about 40 Å in diameter.

The XRD spectrum does not show the presence of any significant scattering phenomenum in the low angular region. Weak and diffuse scatterings similar to those shown in FIG. 7, can be observed around 45 and 66° 2θ, owing to the incipient formation of a γ-alumina type phase.

EXAMPLE 9

A first solution is prepared by dissolving under heat 24.6 g of aluminium sec-butylate in 24.8 g of n-butanol. 5.2 g of tetraethylorthosilicate are then added.

A second solution is prepared by dissolving 1.2 g of ammonium tetrahydrate heptamolibdate in 22.4 g of a water solution of TPA-OH at 27.3% by weight. This solution is maintained at 90° C. in a flask equipped with a reflux condenser.

The first solution is added rapidly and under vigorous stirring to the second solution and the resulting mixture is maintained at 90° C. for an hour, still under stirring.

The composition of the mixture, expressed as molar ratios, is the following:

$SiO_2/Al_2O_3=0.5$ 25 $TPA-OH/Al_2O_3=0.6$
$n-C_4H_9OH/Al_2O_3=6.5$
$H_2O/Al_2O_3=18.2$
$MoO_3/Al_2O_3=0.13$

At the end of the reaction an apparently homogenous gelatinous product is obtained which, once cooled, is dried in a rotavapor at 50–60° C. under vacuum and calcined for 8 hours at 500° C.

The material thus obtained has a surface area of 334 m$^2$/g, the specific pore volume is 0.186 cm$^3$/g and the dimensional distribution of the pores is centered at about 40 Å in diameter.

The XRD spectrum does not show the presence of any significant scattering phenomenum in the low angular region. Weak and diffuse scatterings similar to those shown in FIG. 7, can be observed around 45 and 66° 2θ, owing to the incipient formation of a γ-alumina type phase.

EXAMPLE 10

A first solution is prepared by dissolving under heat 20 g of aluminium sec-butylate in 38 g of n-butanol. 4.1 g of tetraethylorthosilicate and 0.65 g of Ni acetylacetonate are then added.

A second solution is prepared by dissolving 0.96 g of ammonium tetrahydrate heptamolibdate in 40 g of a water solution of TPA-OH at 18.8% by weight.

The first solution is added rapidly and under vigorous stirring to the second solution.

The composition of the mixture, expressed as molar ratios, is the following:

$SiO_2/Al_2O_3=0.5$
$TPA-OH/Al_2O_3=0.6$
$n-C_4H_9OH/Al_2O_3=12.9$
$H_2O/Al_2O_3=46.2$
$MoO_3/Al_2O_3=0.13$
$NiO/Al_2O_3=0.06$

At the end of the reaction a homogenous gelatinous and viscous greenish-blue coloured product is obtained which is dried in a rotavapor at 60° C. under vacuum and calcined for 8 hours at 550° C.

The material thus obtained has a surface area of 454 m$^2$/g, the specific pore volume is 0.573 cm$^3$/g and the dimensional distribution of the pores is centered at between 40 and 60 Å in diameter.

The XRD spectrum shows the presence of a weak scattering phenomenum between 1 and 4° 2θ. Weak and diffuse scatterings similar to those shown in FIG. 7, can be observed around 45 and 66° 2θ, owing to the incipient formation of a γ-alumina type phase.

EXAMPLE 11

A first solution is prepared by dissolving under heat 24.6 g of aluminium sec-butylate in 47.9 g of n-butanol. 5.2 g of tetraethylorthosilicate and 0.82 g of Ni acetylacetonate are then added. A transparent green-coloured solution is obtained.

A second solution is prepared by dissolving 1.2 g of ammonium tetrahydrate heptamolibdate in 56.5 g of a water solution of TPA-OH at 25.9% by weight.

The first solution is added rapidly and under vigorous stirring to the second solution.

The composition of the mixture, expressed as molar ratios, is the following:

$SiO_2/Al_2O_3$=0.5
$TPA-OH/Al_2O_3$=1.43
$n-C_4H_9OH/Al_2O_3$=12.9
$H_2O/Al_2O_3$=46.2
$MoO_3/Al_2O_3$=0.13
$NiO/Al_2O_3$=0.06

At the end of the reaction a homogenous gelatinous and viscous greenish-blue coloured product is obtained which is dried in a rotavapor at 50–60° C. under vacuum and calcined for 8 hours at 550° C.

The material thus obtained has a surface area of 511 m$^2$/g, the specific pore volume is 0.375 cm$^3$/g and the dimensional distribution of the pores is centered at 37 Å in diameter. The XRD spectrum shows a weak scattering phenomenum between 1 and 4° 2θ. Weak and diffuse scatterings can be observed around 45 and 66° 2θ, owing to the incipient formation of a γ-alumina type phase.

EXAMPLE 12

A first solution is prepared by dissolving under heat 50.2 g of aluminium sec-butylate in 95 g of n-butanol. 10.6 g of tetraethylorthosilicate are then added.

This solution is added rapidly and under vigorous stirring to a second solution obtained by dissolving 2.4 g of ammonium tetrahydrate heptamolibdate in 95 g of a water solution of TPA-OH at 12.8%.

The composition of the mixture, expressed as molar ratios, is the following:

$SiO_2/Al_2O_3$=0.5
$TPA-OH/Al_2O_3$=0.6
$n-C_4H_9OH/Al_2O_3$=12.9
$H_2O/Al_2O_3$=46.2
$MoO_3/Al_2O_3$=0.13
$NiO/Al_2O_3$=0.06

At the end of the reaction a homogenous, gelatinous and viscous product is obtained which is dried in a rotavapor at 50–60° C. under vacuum and calcined for 8 hours at 550° C.

15 g of the material thus obtained are finely ground and treated with a solution obtained by dissolving 6.98 g of nichel nitrate in 45 g of water, according to the following procedure:

treatment of the mixture for 1 hour at 80° C. under stirring;
treatment of the mixture for 1 hour at 50° C. under vacuum in a rotavapor until the solvent has been totally eliminated;
drying at 100° C. for 12 hours;
calcination at 400° C. for 4 hours in a stream of air.

Figure 9:
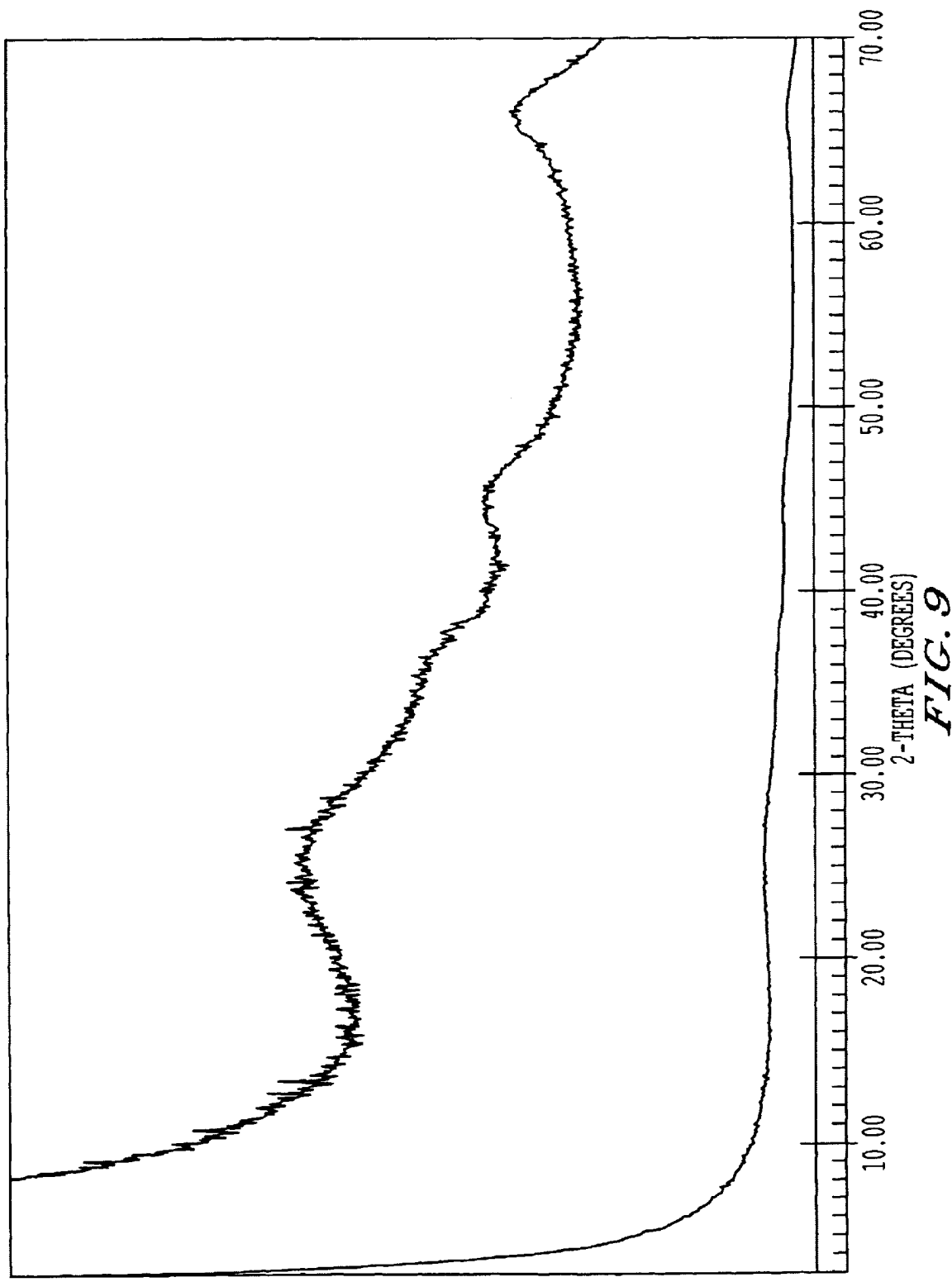
Figure 10:
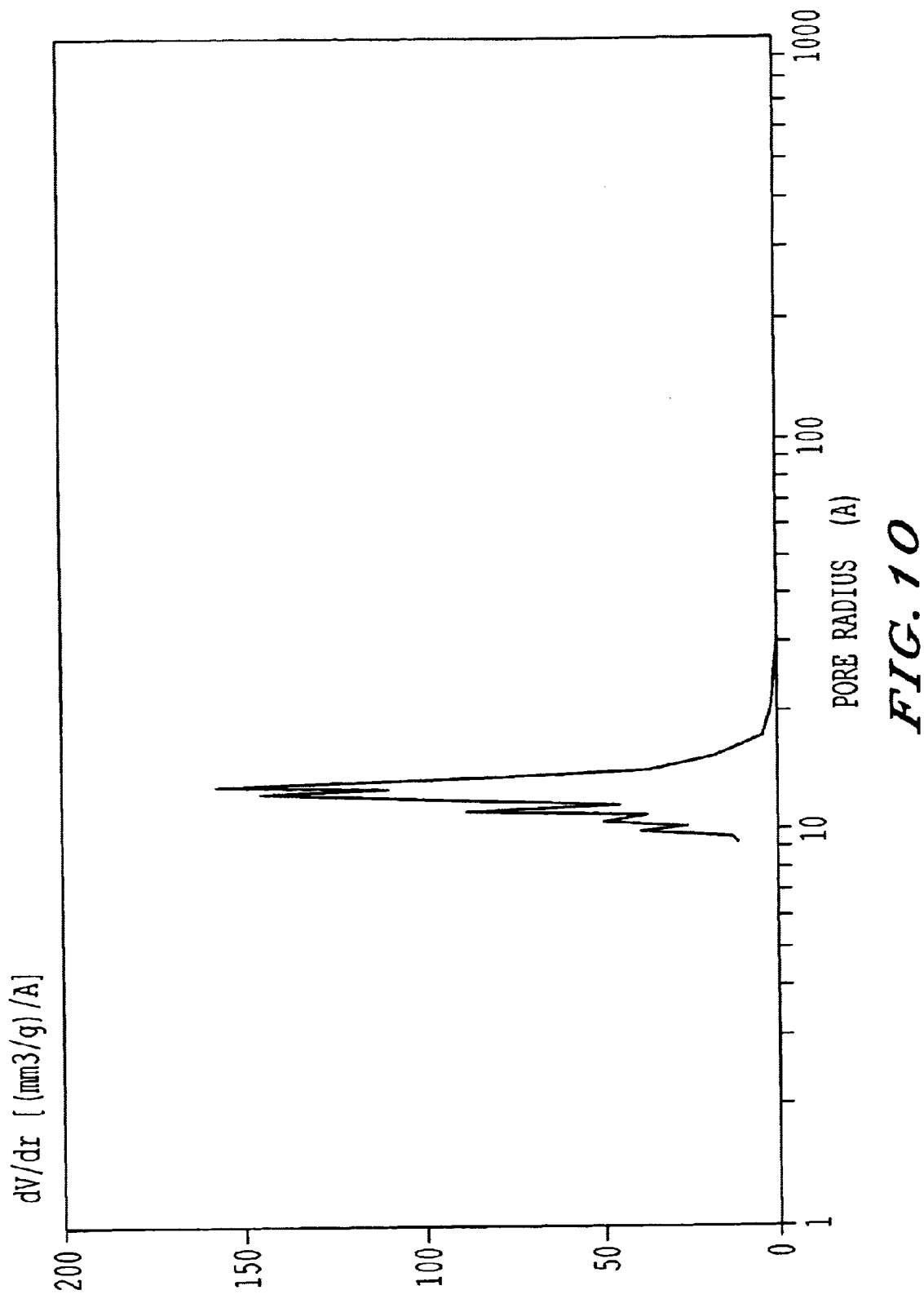

The material thus obtained has the same chemical composition as example 4, with a surface area of 579 m$^2$/g, the specific pore volume is 0.311 cm$^3$/g, with the diameter of the pores centered at 25 Å in diameter FIG. 10). Weak and diffuse scatterings are observed around 45 and 66° 2θ, owing to the incipient formation of a γ-alumina type phase whereas there are neither coherent scattering phenomena in the low angular region, nor reflections which can be attributed to crystalline phases of the Mo and Ni FIG. 9).

EXAMPLE 13

12 g of aluminium sec-butylate are dissolved in 40 g of n-butanol under heat. 0.5 g of boric acid are then added. The solution obtained is added rapidly and under vigorous stirring to 12 g of a water solution of tetrapropylammonium hydroxide (TPA-OH) at 12.8% by weight.

The composition of the mixture, expressed as molar ratios, is as follows:

$B_2O_3/Al_2O_3$=0.165
$TPA-OH/Al_2O_3$=0.31
$n-C_4H_9OH/Al_2O_3$=22.1
$H_2O/Al_2O_3$=23.8

During the mixing of the reagents the formation of a white gel is first observed, which is redispersed, the stirring followed by the formation of a viscous, limpid and homogeneous solutions. The solvent is evaporated in a rotavapor at 60° C. under vacuum and the residual gel is calcined for 8 hours at 550° C.

The material thus obtained has a surface area of 384 m$^2$/g, the specific pore volume is 0.371 cm$^3$/g and the dimensional distribution of the pores is centered at about 37 Å in diameter.

Figure 4:
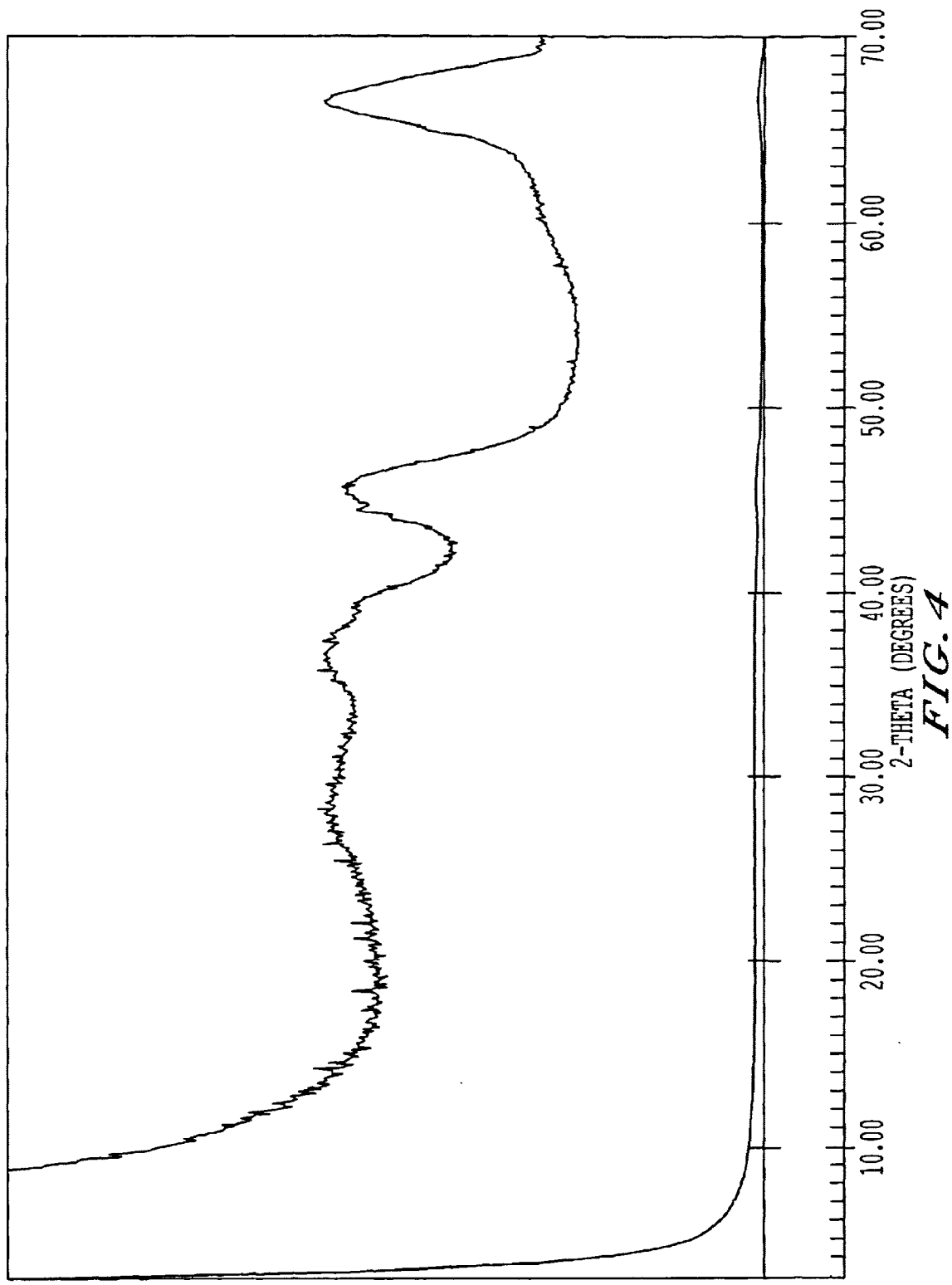

The XRD spectrum shows the presence of a reflection at about 1.3° 2θ. Weak and diffuse scatterings similar to those shown in FIG. 4, can be observed around 45 and 66° 2θ, owing to the incipient formation of a γ-alumina type phase.

EXAMPLE 14

Catalytic Test

The catalytic material described in example 4 was tested in the hydrodesulfuration reaction (HDS) of Light Cycle Oil (LCO) from FCC having the composition indicated in table 1, first column.

Before being put in contact with the charge, the catalyst is activated by presulfuration carried out under the following conditions:

0.8 g of catalyst are charged into an autoclave with 10 ml of n-cetane and 0.8 g of $CS_2$. The autoclave is pressurized with $H_2$ and brought to 360° C. with a heating rate of 30° C./min maintaining a stirring rate of 80 rvs/min. The sulfidation is prolonged for 8 hours at a constant pressure of 80 atm.

At the end the autoclave is depressurized and the n-cetane removed with a pipet. The catalyst is then washed in the reactor with a few ml of the LCO charge.

The catalytic activity test is then carried out with 10 ml of charge (LCO), 80 atm of $H_2$, kept constant during the reaction, at a temperature of 360° C. reached in 20 min. and with a reaction rate of 20 rpm. The duration of the reaction is 110 min., comprising the preheating. The results of the test are shown in the table 1 below, wherein the first column indicates the composition and characteristics of the LCO charge and the second column indicates the composition and characteristics of the mixture resulting from the hydrodesulfuration test.

The considerable decrease in the sulfur content observed by comparing the elemental analysis data shows how the material prepared according to example 4 has desulfurating, hydrogenating and hydrodenitrogenating properties and can therefore be well used in HDS treatments.

TABLE 1

|  | Charge | Catal. Example 4 |
|---|---|---|
| Reactor | — | Batch |
| Density 15° C. | 0.964 | 0.939 |
| Elemental analysis (% w) | | |
| C | 89.08 | 88.46 |
| H | 9.63 | 10.44 |
| N | 0.23 | <0.2 |
| S | 1.04 | 0.31 |
| H/C | 1.297 | 1.416 |
| Distillation Sim. Dist. (° C.) | | |
| PI | 192 | 179 |
| 5 (% w) | 231 | 219 |
| 10 (% w) | 246 | 235 |
| 30 (% w) | 284 | 271 |
| 50 (% w) | 311 | 296 |
| 70 (% w) | 337 | 325 |
| 90 (% w) | 373 | 366 |
| 99 (% w) | 420 | 414 |
| G.C. analysis (% w) | | |
| Saturated products | 22.6 | 23.9 |
| Aromatic products | 77.4 | 76.1 |
| Arom. prod. distrib. via ms (% w) | | |
| Monoaromatic products | 33.2 | 56.3 |
| Diaromatic products | 49.4 | 33 |
| PNA | 17.4 | 10.7 |
| Sulfurated products distrib. via AED (%) | | |
| Benzothiophene prod. | 24.3 | — |
| DBT | 3.4 | 1.7 |
| C1 DBT | 13.7 | 13.4 |
| C2 DBT | 21.6 | 28.9 |
| C3 + DBT | 37 | 56 |

What is claimed is:

1. Mesoporous material comprising an γ alumina throughout which optionally one or more oxides selected from silica, boron oxide, phosphorous oxide, the oxide of a metal of group VIII and/or VIB having general formula $MO_x$, are uniformly dispersed, with the following molar ratios between said oxides and the alumina:

$SiO_2/Al_2O_3$=0–3.0
$B_2O_3/Al_2O_3$=0–4.0
$P_2O_5/Al_2O_3$=0–0.2
$MO_x/Al_2O_3$=0–0.2.

wherein the material has a surface area of between 260 and 700 m²/g, a pore volume of between 0.2 and 1.0 cm³/g, a monomodal pore size distribution of between 20 and 70 Å, and substantially all pore diameters of between 20 and 70 Å,
  wherein an X-ray diffraction spectrum from powders of the mesoporous material exposed to CuKα radiation has in the high angular region a pattern typical or indicative of γ alumina, wherein at angular values of not more than 2θ=5°, there are (1) no coherent scattering phenomena or (2) there is an enlarged diffraction line or there is weak or diffuse scattering, and,
  wherein said material is prepared by a process comprising:
    (a) preparing a solution, in an alcohol having the formula R"OH, wherein R" is a linear or branched $C_1$–$C_5$ group, of an aluminum alkoxide having the formula $Al(OR)_3$, wherein R is a linear or branched $C_1$–$C_5$ alkyl group, and optionally of a source of one or more elements selected from silicon, boron, phosphorous, and/or a compound soluble in an alcohol environment of a metal of a group VIII;
    (b) subjecting the alcohol solution prepared in step (a) to hydrolysis and gelification, at a temperature of between 20 and 80° C., with a water solution containing a hydroxide of tetralkylammonium having the formula $R'_4N$—OH, wherein R' is a linear or branched $C_2$–$C_7$ alkyl group, and optionally a compound of a metal of group VIB soluble in a basic environment, the quantity of the constituents of the mixture thus obtained being such as to respect the following molar ratios:

$H_2O/Al_2O_3$ = 15–100
$R"OH/Al_2O_3$ = 5–50
$R'_4N$—$OH/Al_2O_3$ = 0.3–5
$SiO_2/Al_2O_3$ = 0–3.0
$B_2O_3/Al_2O_3$ = 0–4.0
$P_2O_5/Al_2O_3$ = 0–0.2
$MO_x/Al_2O_3$ = 0–0.2

(c) subjecting the gel obtained in step (b) to drying and calcination.

2. Material in accordance with claim 1 wherein the surface area is between 400 and 700 m²/g.

3. Material in accordance with claim 1 wherein the average pore diameter is between 20 and 60 Å.

4. Material in accordance with claim 1 containing alumina and one or more oxides selected from silica, boron oxide and phosphorus oxide.

5. Material in accordance with claim 1 containing alumina and at least one oxide of a metal selected from group VIII and VIB.

6. Material in accordance with claim 5 containing one or more oxides selected from silica, boron oxide and phosphorus oxide.

7. Material in accordance with claim 5 wherein the metal of group VIB is molybdenum and the metal of group VIII is nickel.

8. Process for preparing a material in accordance with claim 1 comprising:

(a) preparing a solution, in an alcohol having the formula R"OH, wherein R" is a linear or branched $C_1$–$C_5$ group of an aluminium alkoxide having the formula $Al(OR)_3$, wherein R is a linear or branched $C_1$–$C_5$ alkyl group, and possibly of a source of one or more elements selected from silicon, boron, phosphorus, and/or a compound soluble in an alcohol environment of a metal of group VIII;
  (b) subjecting the alcohol solution prepared in step (a) to hydrolysis and gelification, at a temperature of between 20 and 80° C., with a water solution containing a hydroxide of tetralkylammonium having the formula $R'_4N$—OH, wherein R' is a linear or branched $C_2$–$C_7$ alkyl group, and possibly a compound of a metal of group VIB soluble in a basic environment, the quantity of the constituents of the mixture thus obtained being such as to respect the following molar ratios:

| |
|---|
| $H_2O/Al_2O_3$ = 15–100 |
| $R''$—$OH/Al_2O_3$ = 5–50 |
| $R'_4N$—$OH/Al_2O_3$ = 0.3–5 |
| $SiO_2/Al_2O_3$ = 0–3.0 |
| $B_2O_3/Al_2O_3$ = 0–4.0 |
| $P_2O_5/Al_2O_3$ = 0–0.2 |
| $MO_x/Al_2O_3$ = 0–0.2 |

(c) subjecting the material obtained in step (b) to drying and calcination.

9. Process according to claim 8 wherein the silica source is selected from tetra-alkylorthosilicates having the formula $Si(OR''')_4$, wherein $R'''$ is a $C_1$–$C_3$ alkyl group.

10. Process in accordance with claim 8 wherein the boron source is selected from boric acid and trialkyl-borates having the formula $B(OR^{iv})_3$ wherein $R^{iv}$ is ethyl or propyl.

11. Process according to claim 8 wherein the phosphorus source is selected from phosphoric acid and soluble phosphorus salts.

12. Process according to claim 8 wherein the compounds soluble in an alcohol environment of metals of group VIII are acetylacetonates.

13. Process according to claim 8 wherein the compound soluble in a basic environment of a metal of group VIB is $(NH_4)_6Mo_7O_{24}\cdot 4H_2O$.

14. Process according to claim 8 wherein the gelification is completed in a time of between 1 minute and 3 hours.

15. Process according to claim 8 wherein in step (c) the drying is carried out at a temperature of between 50 and 60° C. under vacuum and the calcination is carried out in air at a temperature of between 450° C. and 550° C. for 6–8 hours.

16. A carrier for a catalyst comprising the material in accordance with claim 1.

17. An acid catalyst comprising the material in accordance with claim 4.

18. A hydrotreating catalyst comprising the material in accordance with claim 5 or 6.

19. Material in accordance with claim 1, wherein $P_2O_5/Al_2O_3$=0.

20. Process for preparing a mesoporous material of claim 1 comprising an γ alumina throughout which optionally one or more oxides selected from silica, boron oxide, phosphorous oxide, the oxide of a metal of group VIII and/or VIB having general formula $MO_x$, are uniformly dispersed, with the following molar ratios between said oxides and the alumina:

$SiO_2/Al_2O_3$=0–3.0
$B_2O_3/Al_2O_3$=0–4.0
$P_2O_5/Al_2O_3$=0–0.2
$MO_x/Al_2O_3$=0–0.2 with a surface area of between 260 and 700 m²/g, with a pore volume of between 0.2 and 1.0 cm³/g, with pore diameters of between 20 and 70 Å, comprising:

(a) preparing a solution, in an alcohol having the formula $R''OH$, wherein $R''$ is a linear or branched $C_1$–$C_5$ group, of an aluminum alkoxide having the formula $Al(OR)_3$, wherein R is a linear or branched $C_1$–$C_5$ alkyl group, and optionally of a source of one or more elements selected from silicon, boron, phosphorous, and/or a compound soluble in an alcohol environment of a metal of a group VIII;

(b) subjecting the alcohol solution prepared in step (a) to hydrolysis and gelification, at a temperature of between 20 and 80° C., with a water solution containing a hydroxide of tetralkylammonium having the formula $R'_4N$—$OH$, wherein $R'$ is a linear or branched $C_2$–$C_7$ alkyl group, and optionally a compound of a metal of group VIB soluble in a basic environment, the quantity of the constituents of the mixture thus obtained being such as to respect the following molar ratios:

| |
|---|
| $H_2O/Al_2O_3$ = 15–100 |
| $R''OH/Al_2O_3$ = 5–50 |
| $R'_4N$—$OH/Al_2O_3$ = 0.3–5 |
| $SiO_2/Al_2O_3$ = 0–3.0 |
| $B_2O_3/Al_2O_3$ = 0–4.0 |
| $P_2O_5/Al_2O_3$ = 0–0.2 |
| $MO_x/Al_2O_3$ = 0–0.2 |

(c) subjecting the gel obtained in step (b) to drying and calcination.

21. Material in accordance with claim 19 wherein boron oxide is present.

22. Material in accordance with claim 19 wherein silica and boron oxide are present.

23. Material in accordance with claim 19 consisting of alumina and silica.

24. Material in accordance with claim 19 consisting of alumina and one oxide having general formula $MO_x$.

25. Material in accordance with claim 24 consisting of alumina, molybdenum oxide and nickel oxide.

26. Material in accordance with claim 19 wherein silica and at least one oxide having general formula $MO_x$ are present.

27. Material in accordance with claim 19 wherein boron oxide and at least one oxide having general formula $MO_x$ are present.

28. Material in accordance with claim 19 wherein silica, boron oxide and at least one oxide having general formula $MO_x$ are present.

* * * * *